US008606831B2

(12) United States Patent
Fekri et al.

(10) Patent No.: US 8,606,831 B2
(45) Date of Patent: Dec. 10, 2013

(54) SYSTEMS AND METHODS FOR PROVIDING REPUTATION MANAGEMENT

(75) Inventors: Faramarz Fekri, Atlanta, GA (US); Erman Ayday, Eskisenhir (TR)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 13/544,867

(22) Filed: Jul. 9, 2012

(65) Prior Publication Data

US 2013/0173616 A1 Jul. 4, 2013

Related U.S. Application Data

(60) Provisional application No. 61/505,767, filed on Jul. 8, 2011.

(51) Int. Cl.
*G06F 17/30* (2006.01)

(52) U.S. Cl.
USPC ........... 707/821; 707/770; 707/792; 707/802; 707/803; 709/201; 709/203; 709/213; 709/217; 705/5; 705/14.1; 705/14.49; 705/55; 705/56

(58) Field of Classification Search
USPC ................. 707/659, 770, 821, 802–803, 792; 709/201, 203, 213, 217; 705/1, 5, 10, 705/14, 14.49, 55
See application file for complete search history.

(56) References Cited

U.S. PATENT DOCUMENTS

| | | | | |
|---|---|---|---|---|
| 7,827,052 B2 * | 11/2010 | Scott et al. | | 705/7.11 |
| 7,870,025 B2 * | 1/2011 | English | | 705/14.49 |
| 7,895,177 B2 * | 2/2011 | Wu | | 707/706 |
| 7,962,461 B2 * | 6/2011 | Ruhl et al. | | 707/706 |
| 8,082,295 B2 * | 12/2011 | Nickerson et al. | | 709/203 |
| 8,112,515 B2 * | 2/2012 | Ala-Kleemola et al. | | 709/224 |
| 8,170,958 B1 * | 5/2012 | Gremett et al. | | 705/347 |
| 2003/0055723 A1 * | 3/2003 | English | | 705/14 |
| 2004/0019688 A1 * | 1/2004 | Nickerson et al. | | 709/229 |
| 2004/0107137 A1 * | 6/2004 | Skinner | | 705/14 |

(Continued)

FOREIGN PATENT DOCUMENTS

| | | |
|---|---|---|
| EP | 1855245 A1 * | 11/2007 |
| WO | WO 2008021370 A1 * | 2/2008 |

OTHER PUBLICATIONS

Yu, Bin et al., "An Evidential Model of Distributed Reputation Management", AAMAS'02, Bologna, Italy, ACM 1581134800, Jul. 15-19, 2002, pp. 1-8.

(Continued)

*Primary Examiner* — Frantz Coby
(74) *Attorney, Agent, or Firm* — Ryan A. Schneider, Esq.; Troutman Sanders LLP

(57) ABSTRACT

Systems and methods for providing efficient reputation management schemes resilient to malicious attacks. Methods for providing a reputation management scheme can comprise representing sets of service providers, raters, and ratings of service providers as a factor graph, wherein a factor node is associated with a function representing the probability distributions of the arguments of the function given the trustworthiness value and the ratings associated with a rater; and calculating the probability distributions of each variable in the reputation values of the set of providers using a belief propagation algorithm. In some embodiments, the computational complexity of the method is linear in the number of service providers and raters. In some embodiments, the method can identify malicious behavior and accordingly adjust the trustworthiness value for raters associated with malicious behavior.

20 Claims, 8 Drawing Sheets

(56) References Cited

U.S. PATENT DOCUMENTS

| | | | |
|---|---|---|---|
| 2006/0009994 A1* | 1/2006 | Hogg et al. .................... | 705/1 |
| 2006/0129446 A1* | 6/2006 | Ruhl et al. .................... | 705/10 |
| 2007/0078699 A1* | 4/2007 | Scott et al. .................... | 705/10 |
| 2007/0083472 A1* | 4/2007 | Israel ............................ | 705/55 |
| 2007/0294339 A1* | 12/2007 | Ala-Kleemola et al. ...... | 709/203 |
| 2008/0133488 A1* | 6/2008 | Bandaru et al. ............... | 707/3 |
| 2008/0189164 A1 | 8/2008 | Wiseman et al. | |
| 2008/0288481 A1* | 11/2008 | Zeng et al. .................... | 707/5 |
| 2009/0094041 A1 | 4/2009 | Buss | |
| 2009/0119268 A1* | 5/2009 | Bandaru et al. ............... | 707/3 |
| 2009/0144070 A1* | 6/2009 | Psota et al. .................... | 705/1 |
| 2009/0171992 A1* | 7/2009 | Roberts ......................... | 707/100 |
| 2009/0193011 A1* | 7/2009 | Blair-Goldensohn et al. .... | 707/5 |
| 2009/0299824 A1* | 12/2009 | Barnes, Jr. ..................... | 705/10 |
| 2010/0153181 A1* | 6/2010 | Altunbasak et al. ........... | 705/10 |

OTHER PUBLICATIONS

Bagheri, Ebrahim et al., "A Belief-Theorectic Reputation Estimation Model for Multi-Context Communities", Computer Science, 2008, vol. 5032, 2008, pp. 48-59.

Bickson, Danny, "Guassian Belief Propagation: Theory and Application", Thesis for the Degree of Doctor of Philosophy, 1st Version, Oct. 2008, 2nd Revision May 2009, 117 pgs.

\* cited by examiner

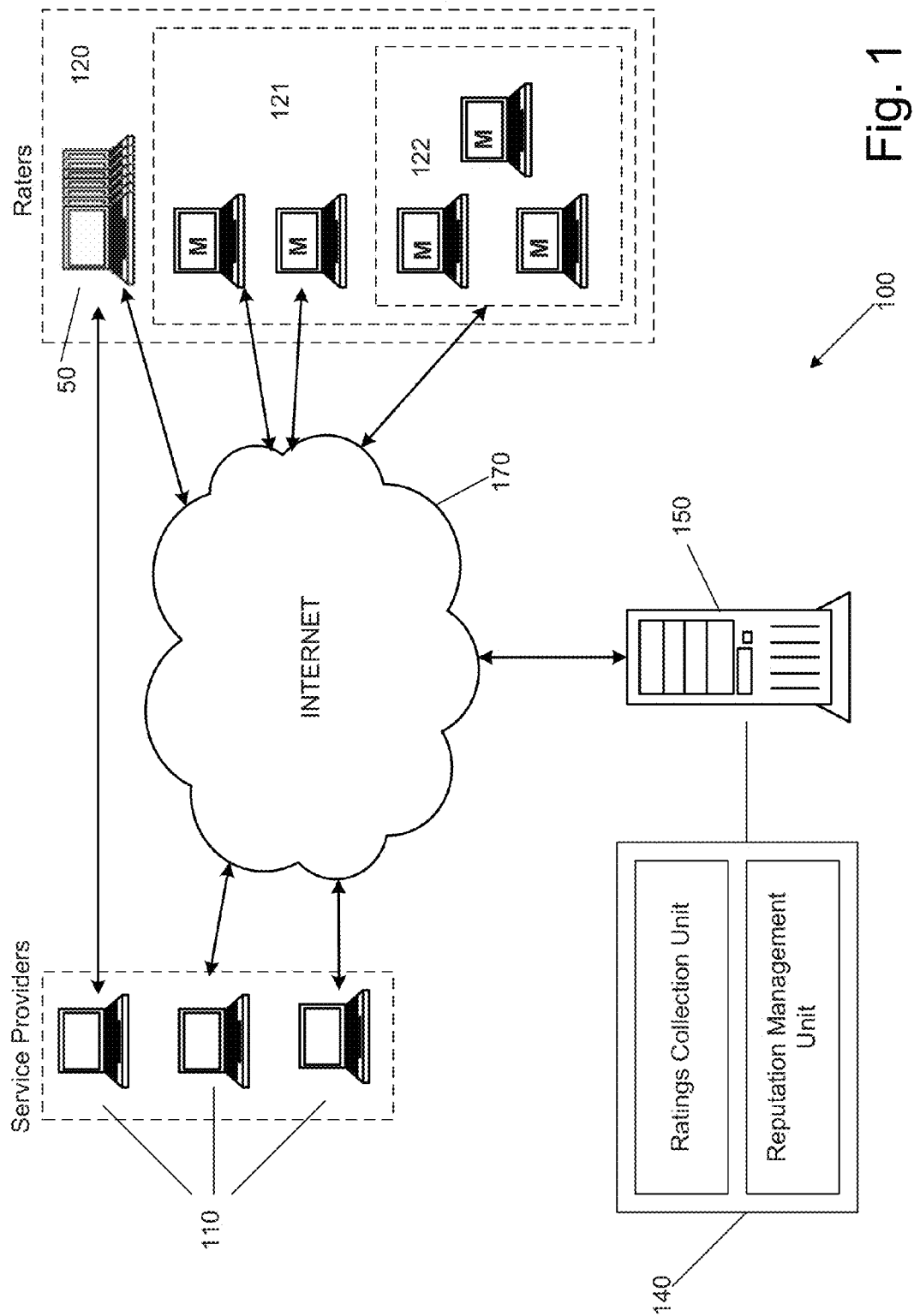

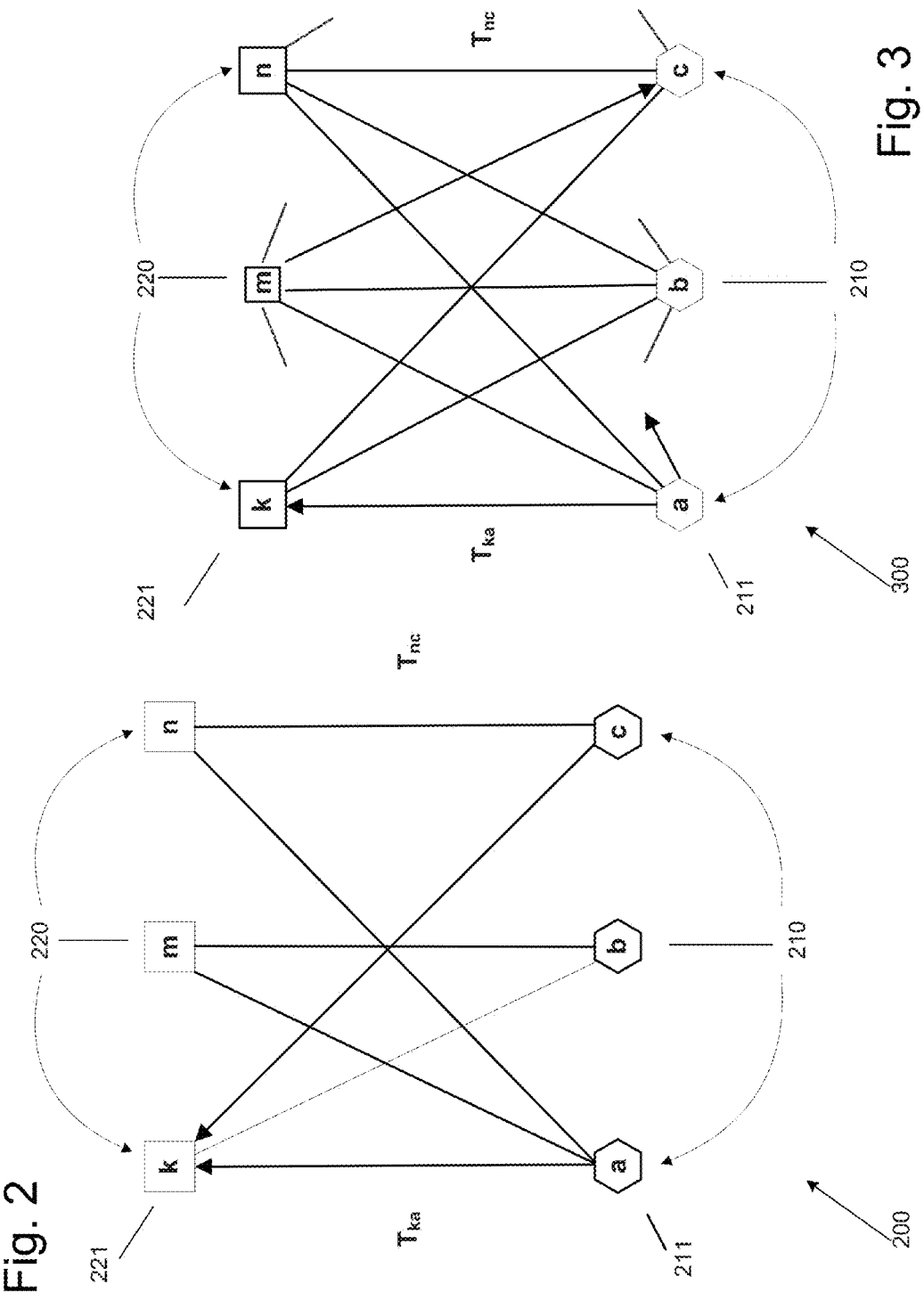

SYSTEMS AND METHODS FOR PROVIDING REPUTATION MANAGEMENT

CROSS-REFERENCE TO RELATED APPLICATIONS

This application claims a benefit, under 35 U.S.C. §119(e), of U.S. Provisional Application Ser. No. 61/505,767, filed 8 Jul. 2011, the entire contents and substance of which are hereby incorporated by reference.

BACKGROUND

1. Technical Field

Various embodiments of the disclosed technology relate to reputation management and, more particularly, to systems and methods for reputation management in an online environment.

2. Description of Related Art

The primary goals of a reputation management scheme are determining the service quality of the peers who provide a service (i.e., service providers) by using feedback from the peers who have rated the service (i.e., raters); and determining the trustworthiness of the raters by analyzing the feedback they provide about the service providers. Thus, the success of a reputation management scheme depends on the robustness of the mechanism to accurately evaluate the reputations of the service providers and the trustworthiness of the raters.

As in every security system, trust and reputation management systems are subject to malicious behaviors. Malicious raters may attack particular service providers (e.g., sellers) to undermine their reputations while helping other service providers by boosting their reputations. Malicious service providers may also provide good service qualities (or sell high-quality products) to certain customers in order to keep their reputations high while cheating other customers unlikely to provide feedback. Moreover, malicious raters or service providers may collaboratively mount sophisticated attack strategies by exploiting their prior knowledge about the reputation mechanism. Hence, building a resilient trust and reputation management system that is robust against malicious activities is a challenging issue.

Various systems exist for enabling reputation management between service providers and users, but the current systems lack several benefits of embodiments of the present disclosed technology. Conventional reputation management schemes include global reputation management schemes where the reputation of a service provider is based on ratings from general users. Many of the prior global reputation management schemes used by many well known web sites such as eBay®, Amazon® Epinions®, and AllExperts™ mostly compute the average (or weighted average) of the ratings received for a peer (or product) to evaluate the global reputation of the peer. Hence, these schemes are vulnerable to collaborative attacks by malicious peers.

Moreover, a reputation management scheme should be efficient. A scheme high in computational complexity runs the risk of becoming out-of-date for failing to keep up with incoming ratings data. For example, in Histos the central node/server keeps all the ratings between the peers and generates a graph to calculate the ratings of each peer for the other peers. (G. Zacharia, A. Moukas, and P. Maes, "Collaborative Reputation Mechanisms in Electronic Marketplaces," in *Proc. 32nd Ann. Hawaii Int'l Conf. System Sciences* (HICSS '99), 1999). However, each update of this graph requires many computations. Hence, this scheme is burdened by high-computational complexity.

SUMMARY

There is a need for efficient, reliable, and scalable reputation management schemes that resist impact from user dishonesty and unreliability and are resilient to malicious attacks.

Exemplary embodiments of the present invention can include reputation management systems and methods. According to an exemplary embodiment, the reputation management method can include receiving a plurality of ratings. Each rating can be associated with a service provider and a rater. The method can further include modeling the service providers, the raters, and the ratings as a factor graph representing the factorization of a joint probability distribution function of variables, calculating the marginal distributions using a belief propagation algorithm applied to the factor graph, and determining reputation values associated with the service providers and trustworthiness values associated with the raters based on the calculating.

Each factor node of the factor graph can correspond to a rater and be associated with a local function representing marginal distributions of a subset of the variables. The subset of variables can include a trustworthiness value associated with the rater and one or more ratings associated with the rater. Each variable node of the factor graph can correspond to a service provider and each service provider can be associated with a reputation value.

Calculating can include iteratively passing messages between factor nodes and variable nodes connected by an edge. An edge can connect a factor node and a variable node and can represent one or more ratings associated with a rater and a service provider corresponding to the factor node and variable node, respectively. Messages can be passed until a termination condition is reached. The termination condition can be reached when the determined reputation values for one or more of the service providers remain constant between at least two iterations. Alternatively, the termination condition can be reached after a certain number of iterations.

A message from a variable node to the factor node can represent a probability that a reputation value associated with the corresponding service provider equals a certain value at a current iteration. A message from a factor node to a variable node represents a probability that a reputation value associated with a corresponding service provider equals a certain value given one or more ratings between the corresponding service provider and a corresponding rater and the trustworthiness value associated with the corresponding rater at the current iteration.

The method can further include receiving an additional rating associated with a first service provider and a first rater and updating an edge corresponding to the first service provider and first rater based on the additional rating and a priority factor. The priority factor can be based at least partially on a time elapsed since receiving a prior rating associated with the first service provider and the first rater. In another embodiment, the priority factor can give greater importance to more recent ratings.

In further embodiments, the computational complexity of calculating can be linear in the number of service providers and raters. The belief propagation algorithm can be in log domain. The mean absolute error of the determined reputation values can be less than or equal to a predetermined error threshold $\epsilon$ for each of the service providers. The service providers and raters can be sellers and buyers. Alternatively the service providers and raters can be nodes on a computer network.

According to another exemplary embodiment, the reputation management system can comprise a plurality of service providers, a plurality of raters, a ratings collection unit, and a reputation management unit. Each service provider can be associated with a reputation value and each rater can be associated with a trustworthiness value. The ratings collection unit can be configured to receive ratings, each rating associated with a service provider from the plurality of service providers and a rater from the plurality of raters. The reputation management unit can be configured to calculate reputation values and trustworthiness values using a belief propagation algorithm.

In further embodiments, the reputation management unit can be configured to calculate reputation values in slotted time. Alternatively, the ratings collection unit can be configured to receive ratings and the reputation management unit can be configured to calculate reputation values in real time. One or more service providers can be raters. The system can be configured to flag raters that have a trustworthiness value lower than a predetermined threshold. The system can also be configured to filter malicious ratings associated with a flagged rater.

These and other objects, features, and advantages of the reputation management systems and methods will become more apparent upon reading the following specification in conjunction with the accompanying drawing figures.

BRIEF DESCRIPTION OF THE FIGURES

FIG. 1 illustrates the diagram of a reputation management system, according to an exemplary embodiment of the present disclosed technology.

FIG. 2 illustrates a representation of service providers and raters together with their associated relations as a factor graph, according to an exemplary embodiment of the disclosed technology.

FIG. 3 illustrates an example factor graph, according to an exemplary embodiment of the disclosed technology.

DETAILED DESCRIPTION

Figure 5:
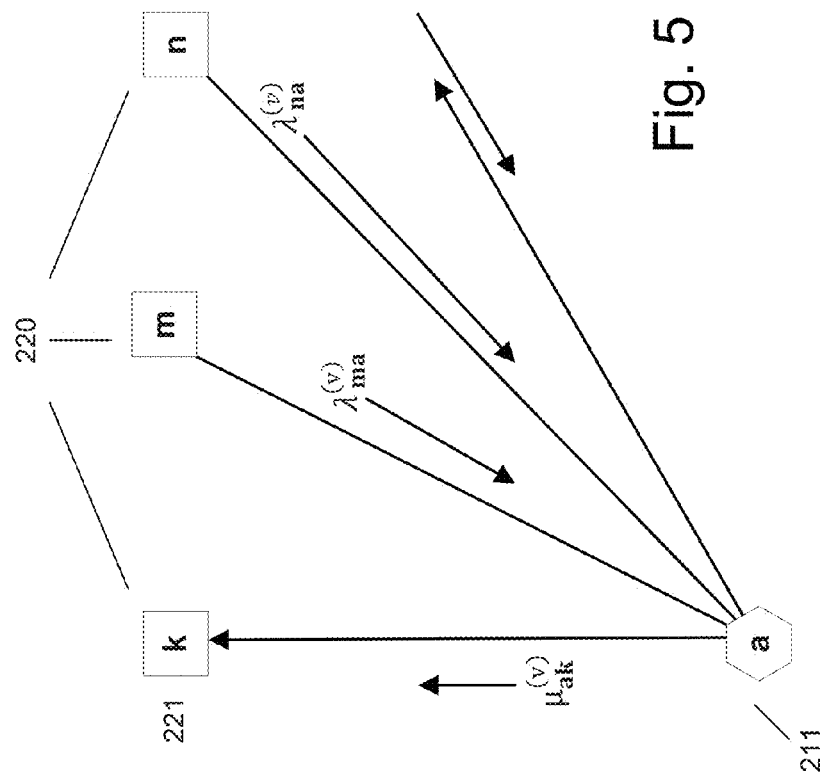
FIG. 5 illustrates a message transfer from the variable node a to the factor node k at the vth iteration, according to an exemplary embodiment of the disclosed technology.

To facilitate an understanding of the principles and features of the disclosed technology, various illustrative embodiments are explained below. Exemplary embodiments of the disclosed technology comprise systems and methods for providing reputation management, such as seller/buyer ratings management for online marketplaces. In particular, embodiments of the systems and methods are described in the context of global trust and reputation management schemes implemented in a web environment. Embodiments of the disclosed technology, however, are not limited to this context. Rather, embodiments of the disclosed technology may be utilized through various communications media such as local area networks, and in various applications such online services, mobile ad-hoc networks, and peer-to-peer systems.

The components described hereinafter as making up various elements of the disclosed technology are intended to be illustrative and not restrictive. Many suitable components that would perform the same or similar functions as components described herein are intended to be embraced within the scope of the reputation management systems. Such other components not described herein may include, but are not limited to, for example, components developed after development of the disclosed technology. It is also to be understood that the mention of one or more method steps does not preclude the presence of additional method steps or intervening method steps between those steps expressly identified.

The disclosed technology introduces a reputation management scheme called "Belief Propagation-Based Iterative Trust and Reputation Management Scheme," or BP-ITRM. BP-ITRM can provide a probabilistic approach to the reputation management problem by applying the belief propagation algorithm in the design and evaluation of trust and reputation management systems. Belief propagation is a message passing algorithm for performing interface on graphical models such as factor graphs, Bayesian networks, or Markov random fields. It can be used for computing marginal distributions of unobserved nodes conditioned on the observed ones.

BP-ITRM is the first application of the belief propagation algorithm to trust and reputation management systems. The disclosed technology is related to graph-based iterative probabilistic decoding of low-density parity-check (LDPC) codes. In LDPC, one of the goals is to find the decoding error for a fixed set of check constraints. Similarly, in the reputation management scheme, a goal is to specify the regions of trust for the set of the system parameters. A region of trust can be the range of parameters for which the reputation values within a given error bound can be determined. However, the application of the belief propagation algorithm to reputation management is harder problem than with LDPC codes as the adversary dynamics are far more complicated to analyze than the erasure channel in the coding problem.

BP-ITRM can compute reputation values of service providers accurately in a short amount of time. The scheme can also provide a robust and efficient methodology for detecting and filtering out malicious ratings. Further, the scheme can detect malicious raters with a high accuracy, and update their trustworthiness, accordingly forcing malicious raters to execute low-grade attacks to remain undercover. Thus, BP-ITRM can significantly outperform the existing and commonly used reputation management techniques such as Averaging Scheme, Bayesian Approach, and Cluster Filtering while under attack from malicious raters.

Embodiments of the disclosed technology can approach reputation management as an inference problem that can be solved by computing marginal likelihood distributions from complicated multivariate global functions. Although computing marginal distributions can generally require summing an exponentially large number of terms, the belief propagation algorithm can be used to efficiently (e.g., in linear complexity) compute these marginal probability distributions.

Referring now to the figures, in which like reference numerals represent like parts throughout the views, various embodiments of reputation management schemes will be described in detail.

I. OVERVIEW

In some service systems, the consumer of the service (e.g., the buyer) has no choice but to rely on the reputation of the service provider (e.g., the seller) based on the consumer's prior experience with that service provider. A reputation management scheme is a promising method to aid the consumer by providing foresight about service providers before purchase. By using a reputation management scheme, a service provider's reputation can be formed based on the combination of received ratings.

FIG. 1 illustrates a diagram of the reputation management system 100, according to an exemplary embodiment of the present disclosed technology. As shown in FIG. 1, transactions may take place between a service provider 110 and a consumer. In an exemplary embodiment of the disclosed technology, the transactions may take place in a web environment, such as in the online sale of goods, or the provision of live information services as described in U.S. patent application Ser. No. 12/431,535. Transactions may also occur in real-world settings, such as the purchase of food at a restaurant by a diner.

After a transaction, a consumer who receives the service or purchases a product can provide one or more reports about the quality of service provided, or ratings. Such consumers are hereinafter referred to as "raters" 120. In an exemplary embodiment, a service provider for a transaction can also be a rater for the same or a different transaction.

Ratings can be posted to or submitted through the web. As shown in FIG. 1, in an exemplary embodiment, a central authority 140 provided by one or more servers 150 can receive one or more ratings of service providers from raters 120. For example, after the provision of a live information service, a rater 120 (e.g., user) can provide online feedback about the service provider 110. The central authority 140 can collect the ratings for a service provider and update the reputation of the service providers based on the ratings. In some embodiments the central authority 140 can comprise a ratings collection unit 141 and/or a reputation management unit 142.

Raters may provide inaccurate ratings for providers. Moreover, malicious raters 121 may intentionally provide erroneous ratings in an attempt to unfairly skew the reputations of one or more service providers 110. Thus, a reputation management scheme can also maintain a trustworthiness value for raters to mitigate the effect of unreliable and malicious ratings. In some cases, raters may also work together to increase the effect of their ratings on the reputation of a service provider. As shown in FIG. 1, malicious groups of raters 122 can collude to attempt to unfairly skew the reputation of a service provider through a variety of techniques, including bad-mouthing and ballot-stuffing.

The disclosed technology enables a reputation management scheme for computing reputation values of service providers accurately in a short amount of time. The scheme can also provide a robust and efficient methodology for detecting and filtering out malicious ratings. Further, the scheme can detect malicious raters with a high accuracy, and update their trustworthiness, accordingly forcing malicious raters to execute low-grade attacks to remain undercover

II. BP-ITRM ALGORITHM

In some embodiments of the disclosed technology, the relationship between service providers ("SPs") 110 and raters 120 can be represented mathematically. For example, a reputation management system can comprise two different sets: a set of service providers, S; and a set of raters, U. These sets are not necessarily disjoint, although they can be. In an exemplary embodiment, a service provider can also be a rater and vice versa.

$G_j$ can represent the reputation value of SP j (j∈S), and $T_{ij}$ can represent the rating that rater i (i∈U) reports about SP j whenever a transaction is completed between the two peers. $R_i$ can denote the trustworthiness of the peer i (i∈U) as a rater. In other words, $R_i$ can represent the amount of confidence that a reputation system has about the correctness of any feedback/rating provided by rater i. Some or all of these parameters can evolve with time. However, for simplicity, time dependencies have been omitted from this exemplary notation.

In an exemplary embodiment, there can be s service providers and u raters in the system, i.e., |S|=s and |U|=u. The collection of variables representing the reputations of the service providers and the trustworthiness values of the raters can be represented as $G=\{G_j: j\in S\}$ and $R=\{R_i: i\in U\}$, respectively. T can represent an s×u service-provider-rater matrix that stores the rating values ($T_{ij}$), and $T_i$ the set of ratings provider by rater i.

Throughout the following examples, embodiments of the reputation management system will be described in slotted time. However, exemplary embodiments of the disclosed technology can also be performed in real-time.

At each a time-slot, the iterative reputation algorithm can be executed using the input parameters R and T to obtain the reputation parameters (e.g., G). After completing its iterations, the BP-ITRM scheme can output new global reputations of the service providers as well as the trustworthiness (R values) of the raters. For simplicity of explanation, the rating values in the following examples are assumed to be from the set Y={0, 1}. However, in an exemplary embodiment, the rating values can take any real number.

The reputation management problem can be viewed as finding the marginal probability distributions of each variable in G, given the observed data (i.e., evidence). There can be s marginal probability functions, $p(G_i|T,R)$, each of which can be associated with a variable $G_j$, the reputation value of SP j. Each marginal probability function $p(G_i|T,R)$ can be obtained as follows:

$$p(G_j | T, R) = \sum_{G\setminus\{G_j\}} p(G | T, R), \quad (1)$$

where the notation $G\setminus\{G_j\}$ implies all variables in G except $G_j$.

Generally speaking, conventional Bayesian approaches solve for these marginal distributions separately, leading to poor estimates as these approaches neglect the interplay of the entire evidence. In contrast, embodiments of the disclosed technology can formulate the problem by considering the global function $p(G|T,R)$, which is the joint probability distribution function of the variables in G given a rating matrix and the trustworthiness values of the raters.

Unfortunately, the number of terms in Equation (1) grows exponentially with the number of variables, making computation infeasible for large-scale systems even for binary reputation values. However, the disclosed technology can factorize the global function in Equation (1) to local functions $f_i$ using a factor graph and utilize the belief propagation algorithm to calculate the marginal probability distributions in linear complexity.

A. Factor Graph

A factor graph is a bipartite graph containing two sets of nodes (corresponding to variables and factors) and edges incident between the two sets. In an embodiment of the disclosed technology, the reputation management system can form a factor graph by setting a variable node for each variable $G_j$, a factor node for each function $f_i$, and an edge connecting variable node j to the factor node i if and only if $G_j$ is an argument of $f_i$.

FIG. 2 illustrates a representation of service providers and raters together with their associated relations as a factor graph 200, according to an exemplary embodiment of the disclosed technology. As shown in FIG. 2, in this representation, each rater 120 corresponds to a factor node 220 in the graph, shown as a square. Each service provider 110 corresponds to a variable node 210 shown as a hexagon in the graph. Each rating is represented by an edge from the factor node to the variable node. For example, if a rater i (i∈U) has a report about SP j (j∈S), an edge can be placed with value $T_{ij}$ from the factor node representing rater i to the variable node representing SP j. In an exemplary embodiment, a service provider that is also a rater can be represented as both a variable node and a factor node in the graph. The factor graph can be, for example and not limitation, implemented in a computer program as a matrix. Other suitable implementations will be apparent to one of skill in the art.

The $T_{ij}$ value between rater i and SP j can be the aggregation of all past and present ratings between these two peers. In an exemplary embodiment, after receiving a new rating from rater i about SP j, the reputation management system 100 can update the value $T_{ij}$ by averaging the new rating and the old value of the edge.

In some embodiments, the old value of an edge can be multiplied with a fading factor. The fading factor can be used to give priority to older or more recent ratings. For example, the factor $y_{ij}(t)$ can be used to incorporate a fading factor of a service provider's reputation. In an exemplary embodiment, a known factor $y_{ij}(t) = v^{t-t_{ij}}$ can be used, where v can be a fading parameter and $t_{ij}$ can be the time when the previous transaction occurred between rater i and SP j occurred. The parameter v can be chosen to give greater importance to more recent ratings, for example, by choosing a v less than one. In other embodiments, a parameter v can be greater than one to give greater importance to older ratings.

The global function $p(G|T,R)$ can factor into products of several local functions, each local function having a subset of variables from G as arguments as follows:

$$p(G | T, R) = \frac{1}{Z} \prod_{i \in U} f_i(\mathcal{G}_i, T_i, R_i), \quad (2)$$

where Z is the normalization constant and $\mathcal{G}_i$ is a subset of G. Hence, in the graph representation, each factor node can be associated with a local function, and each local function $f_i$ can represent the probability distributions of its arguments given the trustworthiness value and the existing ratings of the associated rater. For example, the factor graph 200 as shown in FIG. 2 can correspond to:

$$p(G_a G_b G_c | T, R) = \frac{1}{Z} f_k(G_a, G_b, G_c, T_{ka}, T_{kb}, T_{kc}, R_k) \times \quad (3)$$
$$f_m(G_a, G_b, T_{ma}, T_{mb}, R_m) \times f_n(G_a, G_c, T_{na}, T_{mb}, R_n).$$

These marginal distributions can be calculated using Equation (3) with Equation (1). However, as previously discussed, this can be computationally infeasible. Alternatively, an exemplary embodiment of the disclosed technology can use messages passed between the factor nodes 220 and variable nodes 210 to compute the marginal distributions using belief propagation. As described herein, the word "message" is used as a virtual term. The exchange of messages is not between the actual service providers and raters; the messages between the nodes in the graph (i.e., between the variable and factor nodes) can be real-valued functions formed by the algorithm.

B. Belief Propagation

FIG. 3 illustrates an example factor graph 300, according an exemplary embodiment of the disclosed technology. When a factor graph has no cycles, computing marginal probability functions can be exact. However, the belief propagation algorithm is still well defined and empirically often gives good approximate results for factor graphs with cycles.

In an exemplary application of the belief propagation algorithm, the set of neighbors of the variable node (service provider peer) a 211 and the factor node (rater peer) k 221, as shown in FIG. 3, can be represented as $N_a$ and $N_k$, respectively. Neighbors of a service provider peer are the set of rater peers who rated the service provider while neighbors of a rater peer are the service providers, whom it rated. In an exemplary notation, $\Xi$ and $\Delta$ can represent $N_a\setminus\{k\}$ and $N_k\setminus\{a\}$, respectively.

The belief propagation algorithm can iteratively exchange probabilistic messages between the factor nodes 220 and the variable nodes 210 as shown in FIG. 3, updating the degree of beliefs on the reputation values of the service providers as well as the trustworthiness values of the raters on their ratings at each step, until a stopping condition is reached. In an exemplary embodiment, the stopping condition can be the convergence of one or more variables. In another embodiment, the stopping condition can be a maximum number of iterations.

For example, $G^{(v)}=\{G_j^{(v)}:j\in S\}$ can be the collection of variables representing the values of the variable nodes at the iteration v of the algorithm. The messages from the variable nodes 210 to the factor nodes 220 can be μ and the messages from the factor nodes to the variables nodes can be λ. The message $\mu_{a\to k}^{(v)}(G_a^{(v)})$ denotes the probability of $G_a^{(v)}=l$, $l\in\{0,1\}$ at the vth iteration. On the other hand, $\lambda_{k\to a}^{(v)}(G_a^{(v)})$ denotes the probability that $G_a^{(v)}=l, l\in\{0,1\}$, at the vth iteration given $T_{ka}$ and $R_k$.

Figure 4:
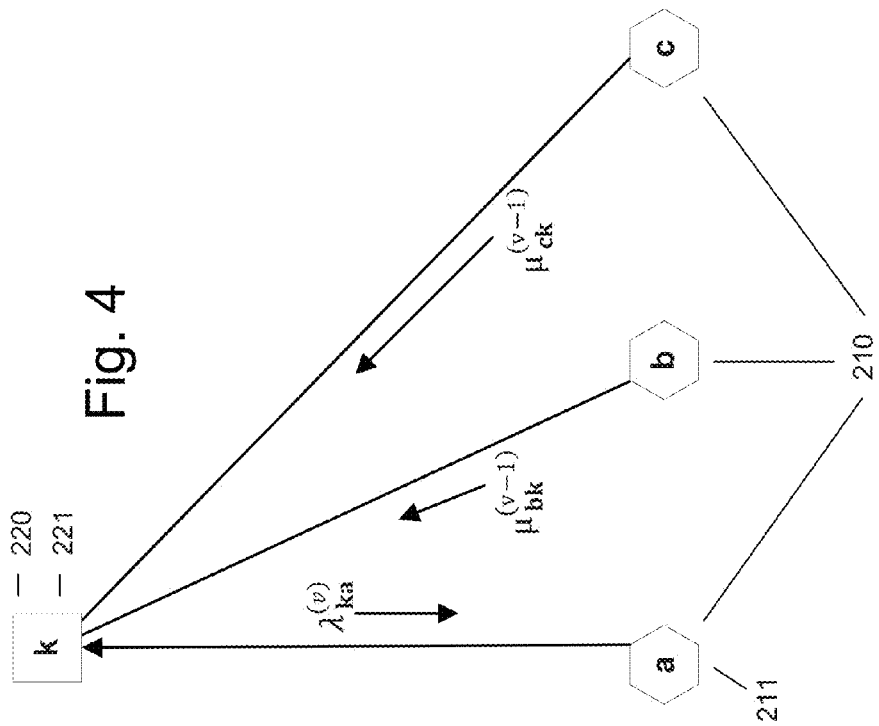
FIG. 4 illustrates a message transfer from factor node k to variable node a at the vth iteration, according to an exemplary embodiment of the disclosed technology.

During a first half of the vth iteration, the message from the factor node k 221 to the variable node a 211 at the vth iteration can be formed using the principles of the belief propagation as $$\lambda_{k\to a}^{(v)}(G_a^{(v)}) = \sum_{G^{(v-1)}\setminus\{G_a^{(v-1)}\}} f_k(\mathcal{G}_k, T_k, R_k^{(v-1)}) \prod_{x\in\Delta} \mu_{x\to k}^{(v-1)}(G_x^{(v-1)}), \quad (4)$$

where $\mathcal{G}_k$ is the set of variable nodes which are the arguments of the local function $f_k$ at the factor node k. FIG. 4 illustrates a message transfer from factor node k 221 to variable node a 211 at the vth iteration, according to an exemplary embodiment of the disclosed technology. $R_k^{(v-1)}$, the trustworthiness of rater k calculated at the end of (v−1)th iteration, can be a value between zero and one, and calculated as follows:

$$R_k^{v-1} = 1 - \frac{1}{|N_k|} \sum_{i\in N_k} \sum_{x\in\{0,1\}} |T_{ki} - x|\mu_{i\to k}^{(v-1)}(x). \quad (5)$$

The above equation can be interpreted as one minus the average inconsistency of rater k calculated by using the messages the corresponding node received from its neighbors. In an exemplary embodiment, raters with trustworthiness values below a threshold can be identified as unreliable or malicious. If raters identified as unreliable or malicious change behavior in the future, they may gain enough trustworthiness to be considered reliable.

Using Equation (4) and the fact that the reputation values in set G are independent from each other, it can be shown that $\lambda_{k\to a}^{(v)}(G_a^{(v)})\propto p(G_a^{(v)}|T_{ka}, R_k^{(v-1)})$, where $$p(G_a^{(v)}|T_{ka}, R_k^{(v-1)}) = \left[\left(R_K^{(v-1)} + \frac{1-R_k^{(v-1)}}{2}\right)T_{ka} + \frac{1-R_k^{(v-1)}}{2}(1-T_{ka})\right] \quad (6)$$

$$G_a^{(v)} + \left[\frac{1-R_k^{(v-1)}}{2}T_{ka} + \left(R_k^{(v-1)} + \frac{1-R_k^{(v-1)}}{2}\right)(1-T_{ka})\right](1-G_a^{(v)}).$$

Given $T_{ka}=1$, $R_k^{(v-1)}$ can be viewed as the belief of the kth rater that $G_a^{(v)}$ is one (at the vth iteration). In other words, in the eyes of rater k, $G_a^{(v)}$ can be equal to 1 with probability $R_k^{(v-1)}$. Thus, $(1-R_k^{(v-1)})$ corresponds to the uncertainty in the belief of rater k. In order to remove this uncertainty and express $p(G_a^{(v)}|T_{ka}, R_k^{(v-1)})$ as the probabilities that $G_a^{(v)}$ is 0 and 1, the uncertainty can be uniformly distributed between two outcomes. Hence in the eyes of the kth rater, $G_a^{(v)}$ is equal to 1 with probability $(R_k^{(v-1)}+(1-R_k^{(v-1)})/2)$, and equal to 0 with probability $((1-R_k^{(v-1)})/2)$. A similar statement holds for the case when $T_{ka}=0$.

Although this may resemble the belief/plausibility concept of the Dempster-Shafer Theory (G. Shafer, "The Dempster-Shafer Theory," *Encyclopedia of Artificial Intelligence*, 1992), embodiments of the disclosed technology do not combine the beliefs of the raters. Instead, the BP-ITRM algorithm can consider the belief of each rater individually and calculate probabilities of $G_a^{(v)}$ being one and zero in the eyes of each rater, as in Equation (6). The above computation can be performed for every neighbor of each factor node, concluding a first half of the vth iteration.

During a second half of the vth iteration, the variable nodes can generate their messages μ and send the messages to their neighbors. FIG. 5 illustrates a message transfer from the variable node a 211 to the factor node k 221 at the vth iteration, according to an exemplary embodiment of the disclosed technology. Variable node a can form $\mu_{a\to k}^{(v)}(G_a^{(v)})$ by multiplying all information it receives from its neighbors excluding the factor node k, as shown in FIG. 5. Hence, the message from variable node a 211 to the factor node k 221 at the vth iteration can be given by:

$$\mu_{a\to k}^{(v)}(G_a^{(v)}) = \frac{1}{\sum_{h\in\{0,1\}}\prod_{i\in\Xi}\lambda_{i\to a}^{(v)}(h)} \times \prod_{i\in\Xi}\lambda_{i\to a}^{(v)}(G_a^{(v)}). \quad (7)$$

This computation can be repeated for every neighbor of each variable node.

The algorithm can process the subsequent iterations in the same way as the vth iteration. The initial iteration can start by computing $\lambda_{k\to a}^{(1)}(G_a^{(1)})$ in Equation (4). However, instead of the using results of calculating in Equation (5), the trustworthiness value $R_k$ from the previous execution of BP-ITRM can be used as the initial values in (6).

The iterations can stop when all variables in G converge (e.g., do not change from the last iteration). At the end of an iteration, the reputation value can be calculated for each service provider. To calculate the reputation value $G_a^{(v)}$, $\mu_a^{(v)}(G_a^{(v)})$ can be first computed using Equation (7) but replacing Ξ with $N_a$, and then solving $(G_a^{(v)})=\Sigma_{i=0}^1 i\mu_a^{(v)}(i)$.

C. Computational Complexity

The computational complexity of BP-ITRM may appear quadratic with the number of raters 120 (or service providers 110) due to the use of the probability-domain message passing algorithm and the multiplications of probabilities in Equations (7) and (4). However, the quadratic computational complexity can be further reduced by using similar techniques developed for message passing decoding of low-density parity-check (LDPC) codes using belief propagation for lower complexity. For example, in an exemplary embodiment, a log-domain algorithm can be used, which is often used for LDPC codes to reduce the complexity. Assuming |U|=u raters and |S|=s service providers in the system, the computational complexity of BP-ITRM can be obtained through max(O(cu), O(cs)) in the number of multiplications, where c can be a small constant number representing the average number of ratings per rater.

III. SECURITY EVALUATION OF BP-ITRM

In this section, BP-ITRM is mathematically modeled and analyzed. The analysis is supported by computer simulations comparing BP-ITRM with existing and commonly used trust management schemes. In order to facilitate future references, frequently used notations are listed in Table 1.

| | |
|---|---|
| S | The set of service providers (SPs) |
| $U_M$ | The set of malicious raters |
| $U_R$ | The set of reliable raters |
| $r_h$ | Rating provided by a reliable rater |
| $r_m$ | Rating provided by a malicious rater |
| d | Total number of newly generated ratings, per time-slot, per a reliable rater. |
| b | Total number of newly generated ratings, per time-slot, per malicious rater. |

Two major attack methods commonly used against trust and reputation management schemes are "bad mouthing" and "ballot stuffing."

In bad mouthing, malicious raters collude and attack the service providers with the highest reputation by giving low ratings in order to undermine the service providers. In some applications, bad mouthing may be originated by a group of selfish peers attempting to weaken high-reputation providers in the hope of improving their own chances as providers.

In ballot stuffing, malicious raters collude to increase the reputation value of peers with low reputations. As in bad mouthing, in some applications, this could be mounted by a group of selfish raters attempting to favor their allies.

In the following exemplary models, various assumptions are made for peers involved in the reputation system. Though not inclusive of every scenario, the models generally illustrate features of the disclosed technology. For example, even though the models assume binary values (0 or 1) for the actual reputation values of service providers, embodiments of BP-ITRM also perform well and give accurate results when the actual reputation values of the service providers are between 0 and 1, or within a different predetermined range, as shown in the simulations section.

In the following exemplary models, it is assumed that:

Attackers can collude and collaborate with each other;

The quality of each service provider remains unchanged during time slots, and the rating values are either 0 or 1, where 1 represents a good service quality;

The total number of newly generated ratings, per time-slot, per a malicious rater is denoted as d, and d is a random variable with Yule-Simon distribution, which resembles a power-law distribution used in modeling online systems, with the probability mass function $f_d(d; p) = pB(d, P+1)$, where B is the Beta function;

Ratings generated by non-malicious raters are distributed uniformly among the service providers (i.e., their ratings/edges in the graph representation are distributed uniformly among service providers);

The rating value $r_h$ (provided by the non-malicious raters) is a random variable with Bernoulli distribution, where $Pr(r_h = \hat{G}_j) = p_c$ and $Pr(r_h \neq \hat{G}_j) = (1 - p_c)$ and $\hat{G}_j$ of the global reputation of SP j;

To the advantage of malicious raters, it is assumed that a total of T time-slots have passed since the initialization of the system and a fraction of the existing raters change behavior and become malicious after T time-slots. In other words, malicious raters behaved like reliable raters before mounting their attacks at the (T+1)th time-slot;

Malicious raters initiate bad mouthing and collude while attacking the service providers who have the highest reputation values by rating them as $r_m = 0$. Although the discussions of the analysis are based on bad-mouthing attacks, a system designed using these criteria will also be robust against ballot stuffing and combinations of bad mouthing and ballot stuffing; and Malicious raters attack the same set Γ of service providers at each time-slot. In other words, Γ is denoted by the set of size b in which every victim service provider has one edge from each of the malicious raters.

ε-Optimal Scheme.

The performance of a reputation scheme can be determined by its accuracy of estimating the global reputations of the service providers. In an exemplary embodiment of the disclosed technology, a reputation scheme is ε-optimal if the mean absolute error (MAE) ($|G_j - \hat{G}_j|$) is less than or equal to ε for every service provider. This criterion introduces a class of optimal schemes and raises the question of: for a fixed ε, what are the conditions to have an ε-optimal scheme? In order to answer this question two conditions must be satisfied: 1) the scheme should iteratively reduce the impact of malicious raters and decrease the error in the reputation values of the service providers until it converges, and 2) the error on the $G_j$ value of each SP j should be less than or equal to ε once the scheme converges. The conditions to arrive at an ε-optimal scheme can be defined as follows.

The bad-mouthing attack is aimed to reduce the global reputation values of the victim service providers. Hence, the $G_j$ value of a victim SP j should be a non-decreasing function of iterations. This leads to the first condition on an ε-optimal scheme.

Lemma 1 (Condition 1).

The error in the reputation values of the service providers decreases with successive iterations (until convergence) if $G_a^{(2)} > G_a^{(1)}$ a is satisfied with high probability for every service provider a (a∈S) with $\hat{G}_a = 1$. The opposite must hold for any service provider with $\hat{G}_a = 0$ Proof.

Let $G_a^{(w)}$ and $G_a^{(w+1)}$ be the reputation value of an arbitrary service provider a with $\hat{G}_a = 1$ calculated at the (w)th and (w+1)th iterations, respectively. $G_a^{(w+1)} > G_a^{(w)}$ if the following is satisfied at the (w+1)th iteration:

$$\prod_{j \in U_R \cap N_a} \frac{2p_c R_j^{(w+1)} + 1 - R_j^{(w+1)}}{-2p_c R_j^{(w+1)} + 1 + R_j^{(w+1)}} \prod_{j \in U_M \cap N_a} \frac{1 - \hat{R}_j^{(w+1)}}{1 + \hat{R}_j^{(w+1)}} >$$

$$\prod_{j \in U_R \cap N_a} \frac{2p_c R_j^{(w)} + 1 - R_j^{(w)}}{-2p_c R_j^{(w)} + 1 + R_j^{(w)}} \prod_{j \in U_M \cap N_a} \frac{1 - \hat{R}_j^{(w)}}{1 + \hat{R}_j^{(w)}}$$

Where $R_j^{(w)}$ and $\hat{R}_j^{(w)}$ are the trustworthiness values of a reliable and malicious rater calculated as in Equation (5) at the wth iteration, respectively. Further, $U_M$ is the set of malicious raters and $U_R$ is the set of reliable raters.

If $G_a^{(w)} > G_a^{(w-1)}$ holds at the wth iteration, then $\hat{R}_j^{(w)} > \hat{R}_j^{(w+1)}$ for j∈$U_M \cap N_a$. Thus, Equation (8) would hold for the (w+1)th iteration. On the other hand, if $G_a^{(w)} < G_a^{(w-1)}$, then $\hat{R}_j^{(w)} < \hat{R}_j^{(w+1)}$ for j∈$U_M \cap N_a$ and $\hat{R}_j^{(w)} < R_j^{(w)}$ for j∈$U_R \cap N_a$. Hence, Equation (8) is not satisfied at the (w+1)th iteration. Therefore, if $G_a^{(w)} > G_a^{(w-1)}$ holds for some iteration w, then an exemplary BP-ITRM algorithm can reduce the error on the global reputation value ($G_a$) until the iterations stop, and hence, is sufficient to satisfy $G_j^{(2)} > G_j^{(1)}$ with high probability for every SP j with $\hat{G}_j = 1$ (the set of service providers from which the victims are taken) to guarantee that the exemplary BP-ITRM can iteratively reduce the impact of malicious raters until the algorithm stops.

As described previously, iterations of BP-ITRM can stop when the $G_j$ values converge for every SP j. The following lemma shows that BP-ITRM can converge to a unique solution given Condition 1 is satisfied.

Lemma 2.

Given Condition 1 holds, the $G_j$ value of SP j converges to a unique solution ($\overline{G}_j$)

Proof.

From Lemma 1, the exemplary BP-ITRM can iteratively reduce the error in the reputation values of the service providers provided that Condition 1 is satisfied. Further, given Condition 1 is satisfied, the error in the reputation value of an arbitrary SP j can stop decreasing at the vth iteration when $G_j^{(v)} = G_j^{(v+1)}$, where the value of v depends on the fraction of malicious raters. Thus, given that the exemplary BP-ITRM satisfies Condition 1, the reputation value of every service provider converges to a unique value.

Although the error in the reputation values of the service providers decreases with successive iterations because of the Condition 1, it is unclear what would be the eventual impact of malicious raters. Hence, in the following, probability P for $\epsilon$-optimality is derived.

Lemma 3 (Condition 2).

Suppose that the Condition 1 is met. Let v be the iteration at which the algorithm has converged. Then, the exemplary BP-ITRM would be an $\epsilon$-optimal scheme with probability P, where P is given in (9) as follows:

$$P = \prod_{a \in S} Pr$$

$$\left\{ \epsilon \geq 1 - \left\{ \prod_{j \in U_R \cap N_a} (2p_c R_j^{(v+1)} + 1 - R_j^{(v+1)}) \prod_{j \in U_M \cap N_a} (1 - \hat{R}_j^{(v+1)}) \right\} \middle/ \right.$$

$$\left\{ \prod_{j \in U_R \cap N_a} (2p_c R_j^{(v+1)} + 1 - R_j^{(v+1)}) \prod_{j \in U_M \cap N_a} (1 - \hat{R}_j^{(v+1)}) + \right.$$

$$\left. \left. \prod_{j \in U_R \cap N_a} (-2p_c R_j^{(v+1)} + 1 + R_j^{(v+1)}) \prod_{j \in U_M \cap N_a} (1 + \hat{R}_j^{(v+1)}) \right\} \right\}$$

Proof.

Given Condition 1 is satisfied, $G_a$ value of an arbitrary service provider a (with $\hat{G}_a = 1$) increases with iterations. Let the exemplary BP-ITRM converge at the vth iteration. Then, to have an $\epsilon$-optimal scheme, $G_a$ value calculated at the last iteration of the exemplary BP-ITRM should result in an error less than or equal to $\epsilon$ for every service provider. That is, the following should hold for every service provider:

$$1 - G_a^{(v)} \leq \epsilon$$

Further, if the exemplary scheme continues one more iteration after convergence, it can be shown that:

$$G_a^{(v+1)} = G_a^{(v)}$$

Thus, combining Equation (10) and Equation (11) leads to Equation (9).

Conditions 1 and 2 in Lemmas 1 and 3 are to give an insight about the performance of the algorithm prior to the implementation. Hence, these conditions do not need to be checked at each execution of the exemplary BP-ITRM in the real-life implementation of the algorithm.

Finally, the variation of the probability of the exemplary BP-ITRM being an $\epsilon$-optimal scheme over time is an important factor affecting the performance of the scheme. It was observed that given the exemplary BP-ITRM satisfies Condition 1 (that the error in the reputation values of the service providers monotonically decreases with iterations), the probability of the exemplary BP-ITRM being an $\epsilon$-optimal scheme increases with time. This criteria is given by the following lemma:

Lemma 4.

Let $P_{T+1}$ and $P_{T+2}$ be the probabilities that the exemplary BP-ITRM is an $\epsilon$-optimal scheme at the (T+1)th and (T+2)th time-slows, respectively, Then, given Condition 1 holds at the (T+1)th time-slot, $P_{T+2} > P_{T+1}$.

Proof.

Due to the fading factor, the contributions of the past reliable ratings of the malicious raters to their $R_i$ values become less dominant with increasing time. Let $R_i(T)$ and $\hat{R}_i(T)$ be the trustworthiness of a reliable and malicious rater at the Tth time-slot, respectively. Then, given that Condition 1 is satisfied at the (T+1)th time-slot, it can be shown that $R_i(T+1) \geq R_i(T)$ and $\hat{R}_i(T+1) < \hat{R}_i(T)$. Thus, the probability that the exemplary BP-ITRM satisfies Condition 1 increases at the (T+2)th time-slot.

The following example illustrates the results of the above analytical evaluation. The parameters used were $|U_M| + |U_R| = 100$, $p=1$, $v=0.9$, $T=50$, $b=5$, and $p_c = 0.8$. The exemplary BP-ITRM was also evaluated with different parameters and obtained similar results. BP-ITRM can work properly when the error in the reputation values of the service providers decreases monotonically with iterations until convergence. In other words, Condition 1 (in Lemma 1) can be a fundamental requirement.

Figure 6:
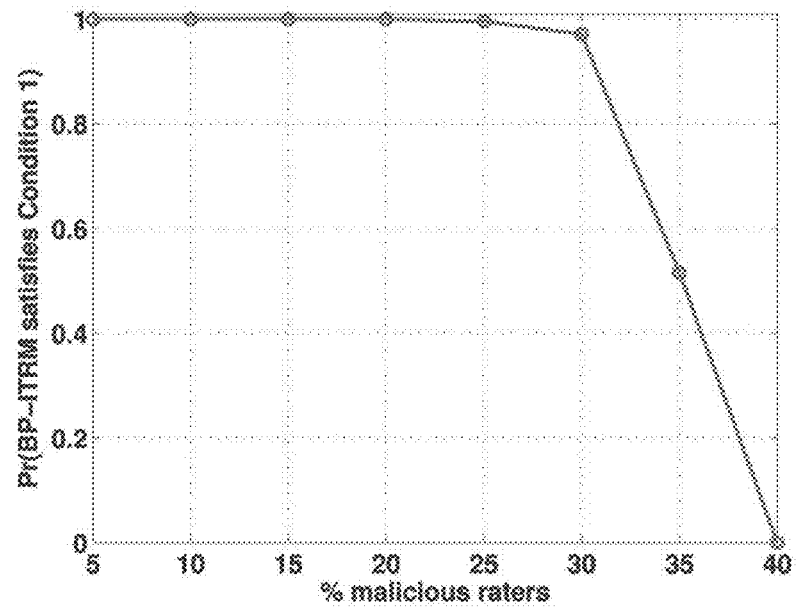
FIG. 6 illustrates the probability of an exemplary BP-ITRM to satisfy Condition 1 versus different fractions of malicious raters, according to an exemplary embodiment of the disclosed technology.

FIG. 6 illustrates the probability of an exemplary BP-ITRM to satisfy Condition 1 versus different fractions of malicious raters, according to an exemplary embodiment of the disclosed technology. It was observed that the exemplary BP-ITRM satisfies Condition 1 with a high probability for up to 30 percent malicious raters. Further, a threshold phenomenon was observed. That is, the probability of BP-ITRM to satisfy Condition 1 can suddenly drop after exceeding a particular fraction of malicious raters.

Figure 7:
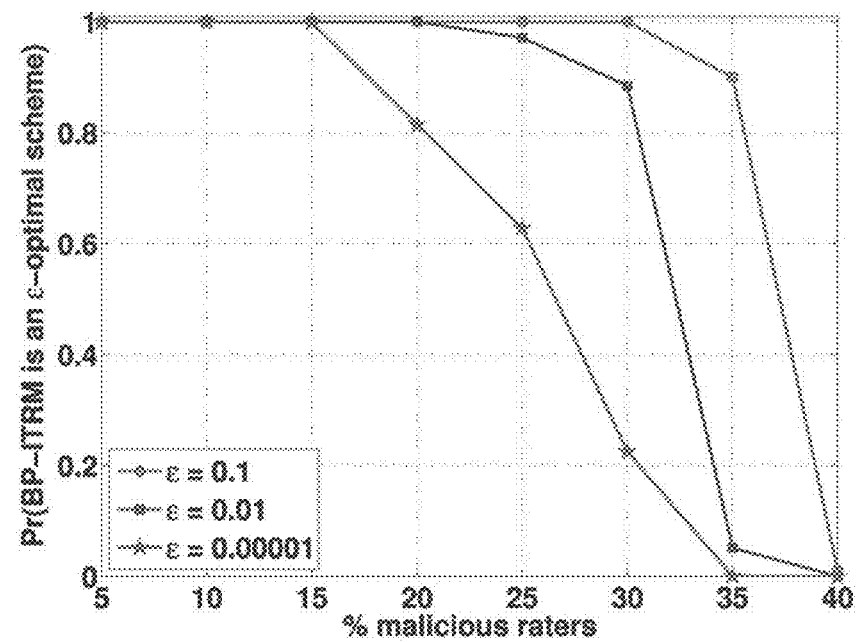
FIG. 7 illustrates the probability of an exemplary BP-ITRM being an $\epsilon$-optimal scheme versus different fractions of malicious raters for three different $\epsilon$ values, according to an exemplary embodiment of the disclosed technology.

FIG. 7 illustrates the probability of an exemplary BP-ITRM being an $\epsilon$-optimal scheme versus different fractions of malicious raters for three different $\epsilon$ values, according to an exemplary embodiment of the disclosed technology. Again, a threshold phenomenon was observed. As shown in FIG. 7, as the fraction of adversary exceeds a certain value, the probability of BP-ITRM being an $\epsilon$-optimal scheme drops sharply.

Figure 8:
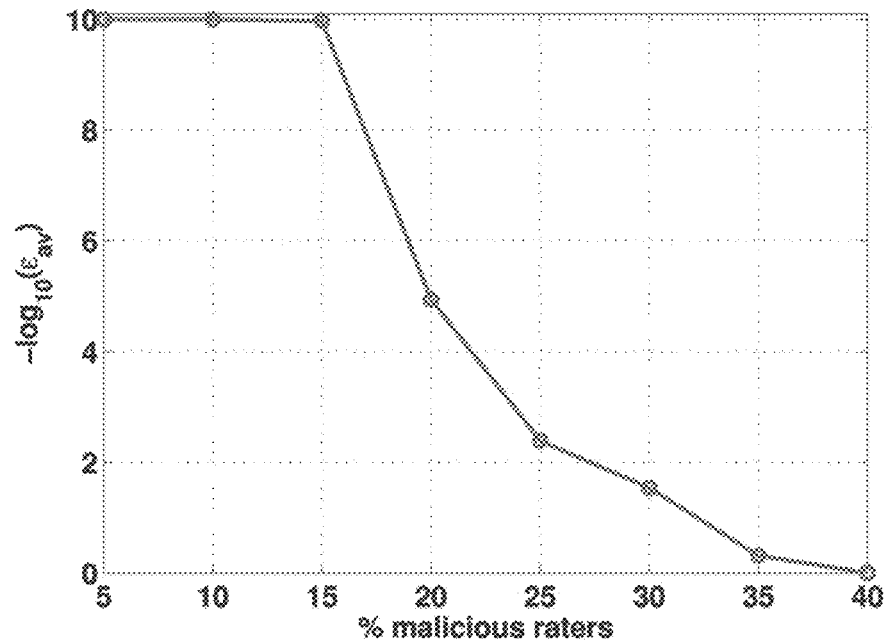
FIG. 8 illustrates the average $\epsilon$ values ($\epsilon_{av}$) for which an exemplary BP-ITRM is an $\epsilon$-optimal scheme with high probability for different fractions of malicious raters, according to an exemplary embodiment of the disclosed technology.

FIG. 8 illustrates the average $\epsilon$ values ($\epsilon_{av}$) for which an exemplary BP-ITRM is an $\epsilon$-optimal scheme with high probability for different fractions of malicious raters, according to an exemplary embodiment of the disclosed technology. It was observed that BP-ITRM provides significantly small error values for up to 30 percent malicious raters. These analytical results are also consistent with the simulation results that are illustrated in the next section.

IV. SIMULATIONS

The results provided in this section are based on the example attack model described above and evaluate the performance for the time-slot (T+1). The performance of an exemplary BP-ITRM is compared with three well known and commonly used reputation management schemes: 1) The Averaging Scheme, 2) Bayesian Approach, and 3) Cluster Filtering. The Averaging Scheme is used in eBay® and Amazon®.

The Bayesian Approach updates $G_j$ using a Beta distribution. Buchegger's Bayesian approach was implemented for the comparison with the deviation threshold d=0.5 and trustworthiness threshold t=0.75. (S. Buchegger and J. Boudec, "Coping with False Accusations in Misbehavior Reputation Systems for Mobile Ad Hoc Networks," *Technical Report IC/2003/31, EPFL-DI-ICA*, 2003.) Since this exemplary BP-ITRM is presented in a centralized setting, Buchegger's work may be considered as similar. However, Buchegger's approach is susceptible to colluding malicious raters.

Buchegger's approach first calculates the reputation value of a particular service provider, and then based on the calculated value, adjusts each rater's trustworthiness value. When the malicious raters collude (as in a worst-case attack scenario), it is likely that the majority of the ratings to the victim service providers will be from malicious raters. In this scenario, the Bayesian approach not only fails to filter the malicious ratings but it also punishes the reliable raters which rates the victim service providers. This shortcoming will become apparent in the disclosed simulations.

Cluster Filtering on the other hand performs a dissimilarity test among the raters and then updates $G_j$ using only the reliable raters. BP-ITRM is also compared with the inventors' previous work on iterative trust and reputation management (ITRM) to show the benefit of using belief propagation.

In the following simulations, various assumptions were made for peers involved in the reputation system to simulate worst-case scenario malicious attacks. It was assumed that:

The total number of newly generated ratings, per time-slot, per a malicious rater is denoted as d, and d is a random variable with Yule-Simon distribution (with p=1 throughout the simulations);

The fading parameter is set as v=0.9 and number of ratings, per time-slot, by a malicious rater as b=5. The Averaging Scheme, Bayesian Approach, and Cluster Filtering were also configured to use the same fading mechanism with fading parameter v=0.9.

Malicious raters collude and attack the service providers who have the highest reputation values (assuming that the attackers knows the reputation values) and received the lowest number of ratings from the reliable raters (assuming that the attackers have this information). This assumption may not hold in practice since the actual values of the global reputations and number of ratings received by each service provider may not be available to malicious raters. However, it was assumed that this information is available to malicious raters to consider the worst case scenario;

Malicious raters collude and attack the same set $\Gamma$ of service providers in each time-slot (which represents the strongest attack by the malicious raters); and There are $|U|=100$ rater peers and $|S|=100$ service-provider peers. Moreover, a total of T=50 time-slots have passed since the launch of the system and reliable reports generated during those time-slots were distributed among the service providers uniformly.

For the first set of simulations, it was assumed that a fraction of the existing raters change behavior and become malicious after the start of the system (i.e., at time-slot one). The rating values were either 0 or 1. Using all their edges, the malicious raters colluded and attacked the service providers who have the highest reputation values and received the lowest number of ratings from the reliable raters, by rating them as $r_m=0$. This attack scenario represents the RepTrap attack (Y. Yang, Q. Feng, Y. L. Sun, and Y. Dai, "RepTrap: a Novel Attack on Feedback-Based Reputation Systems," *Proc. Fourth Int'l Conf. Security and Privacy in Comm. Networks (SecureComm '08)*, pp. 1-11, 2008), which has been shown to be a strong attack.

Further, it was assumed that the rating $r_h$ (provided by the non-malicious raters) is a random variable with Bernoulli distribution, $\Pr(r_h=\hat{G}_j)=0.8$ and $\Pr(r_h\neq\hat{G}_j)=0.2$. Thus, the RepTrap attack scenario becomes even more severe. FIGS. 9-15 illustrate simulations of BP-ITRM and various schemes, according to exemplary embodiments of the disclosed technology. The plots in FIGS. 9-15 are shown from the time-slot the adversary introduced its attack.

Figure 9:
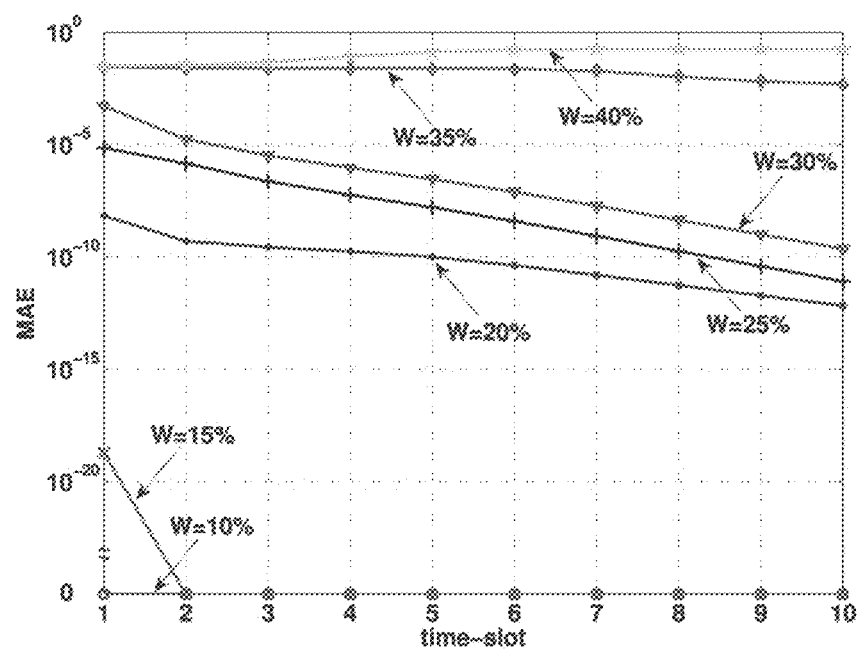
FIG. 9 illustrates a simulation of the MAE performance of an exemplary BP-ITRM versus time when W of the existing raters become malicious under the RepTrap attack, according to an exemplary embodiment of the present disclosed technology.

First, the MAE performance of BP-ITRM was evaluated for different fractions of malicious raters $$\left(W = \frac{|U_M|}{|U_M|+|U_R|}\right)$$

at different time-slots. FIG. 9 illustrates a simulation of the MAE performance of an exemplary BP-ITRM versus time when W of the existing raters become malicious under the RepTrap attack, according to an exemplary embodiment of the present disclosed technology. It was observed from the simulation that BP-ITRM provides significantly low errors for up to W=30% malicious raters. Moreover, the MAE at the first time slot is consistent with the analytical evaluation which was illustrated in FIG. 7.

Figure 10:
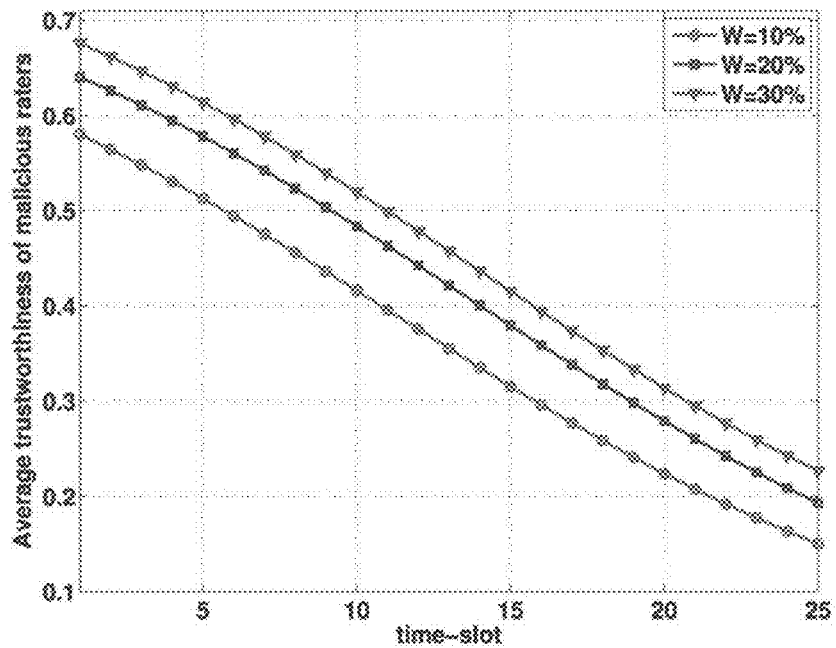
FIG. 10 illustrates a simulation of the change in average trustworthiness of malicious raters versus time for an exemplary BP-ITRM when W of the existing raters become malicious under the RepTrap attack, according to an exemplary embodiment of the present disclosed technology.

Next, the change in the average trustworthiness ($R_i$ values) of malicious raters with time was observed. FIG. 10 illustrates a simulation of the change in average trustworthiness of malicious raters versus time for an exemplary BP-ITRM when W of the existing raters become malicious under the RepTrap attack, according to an exemplary embodiment of the present disclosed technology. A drop in the trustworthiness of the malicious raters with time was observed. It was concluded that the $R_i$ values of the malicious raters decrease over time, and hence, the impact of their malicious ratings is totally neutralized over time.

Figure 11:
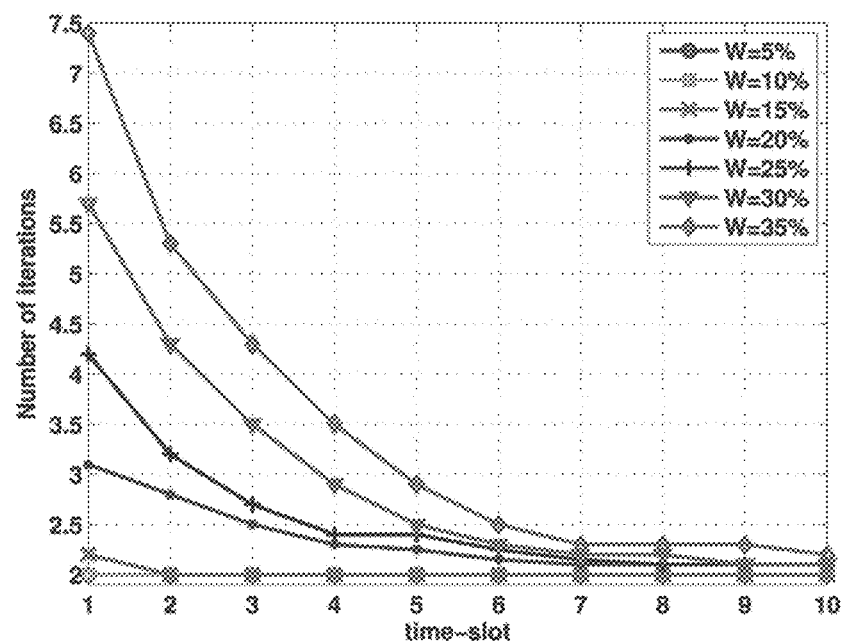
FIG. 11 illustrates a simulation of the average number of iterations versus time for an exemplary BP-ITRM when W of the existing raters become malicious under the RepTrap attack, according to an exemplary embodiment of the present disclosed technology.

FIG. 11 illustrates a simulation of the average number of iterations versus time for an exemplary BP-ITRM when W of the existing raters malicious become under the RepTrap attack, according to an exemplary embodiment of the present disclosed technology. From the results, it was concluded that the average number of iterations for BP-ITRM decreases with time and decreasing fraction of malicious raters.

Figure 12:
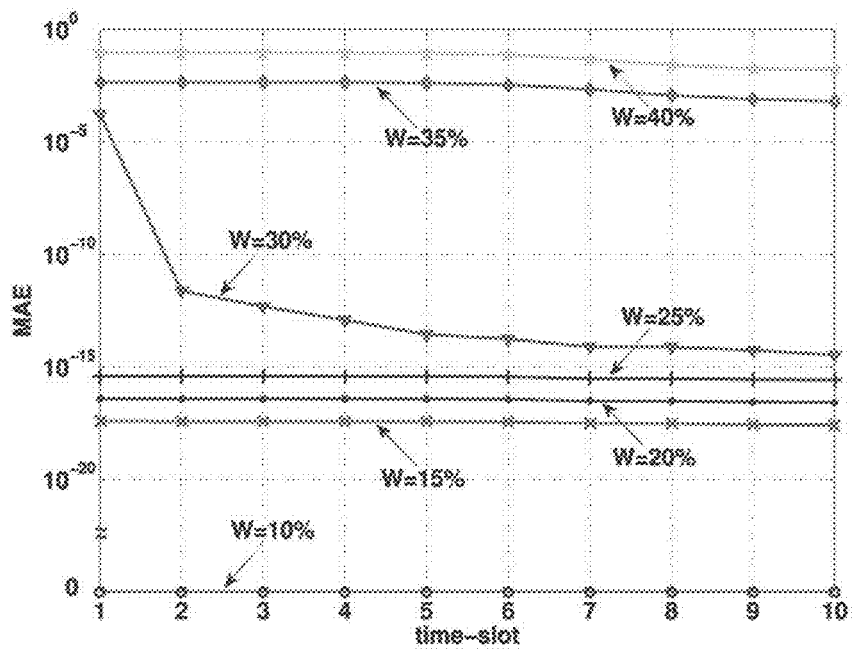
FIG. 12 illustrates a simulation of the MAE performance of various schemes when 30 percent of the existing raters become malicious under the RepTrap attack, according to an exemplary embodiment of the present disclosed technology.

Finally, MAE performance of BP-ITRM was compared with the other schemes. FIG. 12 illustrates a simulation of the MAE performance of various schemes when 30 percent of the existing raters become malicious under the RepTrap attack, according to an exemplary embodiment of the present disclosed technology. It is clear from the results that BP-ITRM outperforms all the other techniques significantly.

The same attack scenario was simulated when ratings were integers from the set $\{1, \ldots, 5\}$ instead of binary values. It was assumed that the rating $r_h$ is a random variable with folded normal distribution (mean $\hat{G}_j$ and variance 0.5). Malicious raters choose service providers from $\Gamma$ and rate them as $r_m=4$. Malicious raters do not deviate very much from the actual $\hat{G}_j=5$ values to remain undercover (while still attacking) as many time-slots as possible. Higher deviations from the $\hat{G}_j$ value were tried and it was observed that the malicious raters were easily detected by BP-ITRM.

Figure 13:
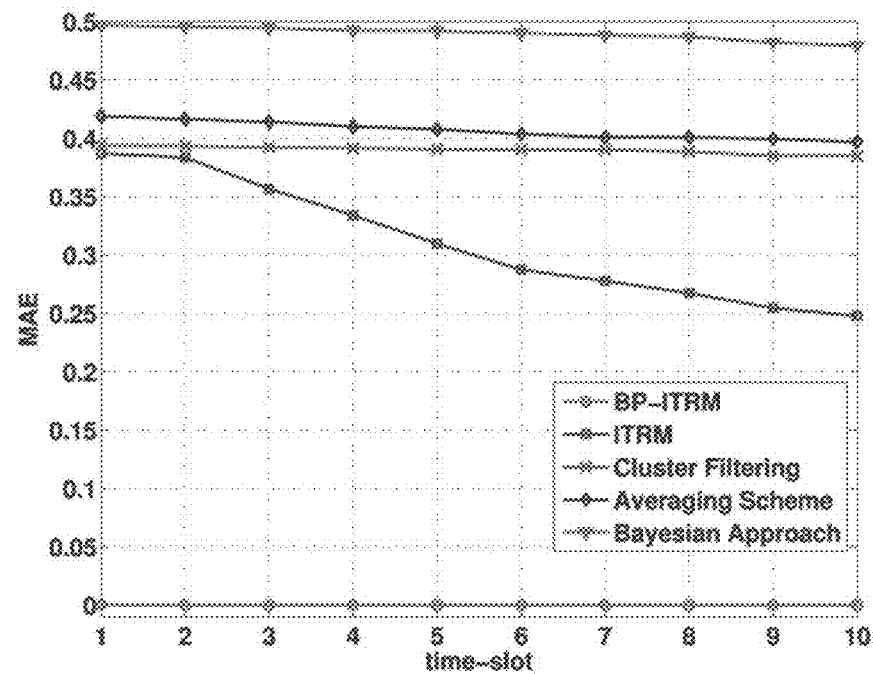
FIG. 13 illustrates a simulation of the MAE performance of an exemplary BP-ITRM versus time when W of the existing raters become malicious and rating values are integers from $\{1, \ldots, 5\}$ under the RepTrap attack, according to an exemplary embodiment of the present disclosed technology.

FIG. 13 illustrates a simulation of the MAE performance of an exemplary BP-ITRM versus time when W of the existing raters become malicious and rating values are integers from $\{1, \ldots, 5\}$ under the RepTrap attack, according to an exemplary embodiment of the present disclosed technology. It was observed that BP-ITRM provides significantly low MAE for up to W=40% malicious raters.

Figure 14:
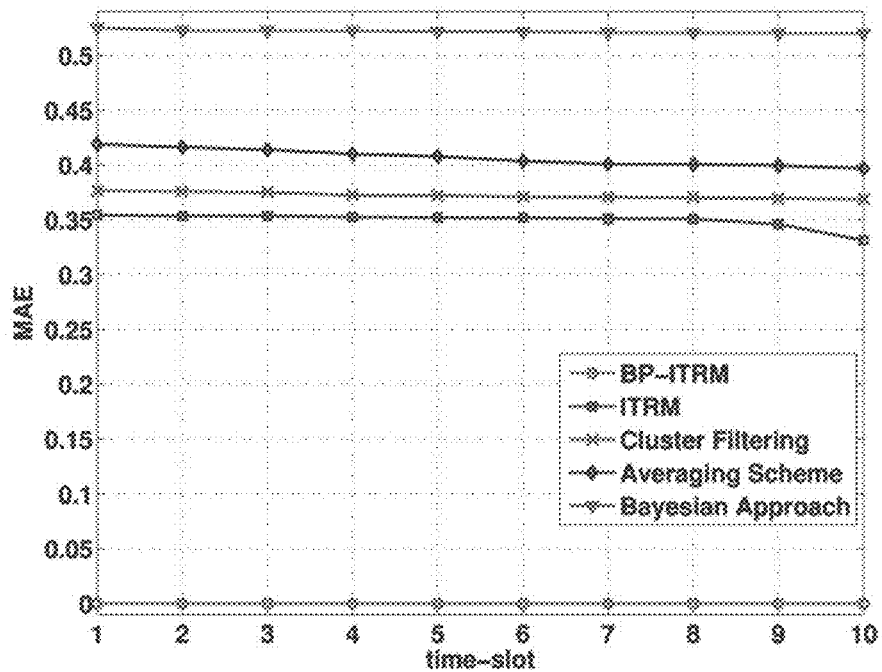
FIG. 14 illustrates a simulation of the MAE performance of various schemes when 30 percent of the existing raters become malicious and rating values are from $\{1; \ldots; 5\}$ under the RepTrap attack, according to an exemplary embodiment of the present disclosed technology.

FIG. 14 illustrates a simulation of the MAE performance of various schemes when 30 percent of the existing raters become malicious and rating values are from {1, . . . , 5} under the RepTrap attack, according to an exemplary embodiment of the present disclosed technology. It was observed that BP-ITRM outperforms all the other techniques significantly.

In many trust and reputation management systems, the adversary causes the most serious damage by introducing newcomer raters to the system. Since it is not possible for the system to know the trustworthiness of the newcomer raters, the adversary may introduce newcomer raters to the systems and attack the service providers using those raters. To study the effect of newcomer malicious raters to the reputation management scheme, 100 more raters were introduced as newcomers. Hence, there were $|U_M|+|U_R|=200$ raters and $|S|=100$ service providers in total. The rating values are either 0 or 1, $r_h$ is a random variable with Bernoulli distribution as before, and malicious raters choose service providers from $\Gamma$ and rate them as $r_m=0$ (this particular attack scenario does not represent the RepTrap attack).

Figure 15:
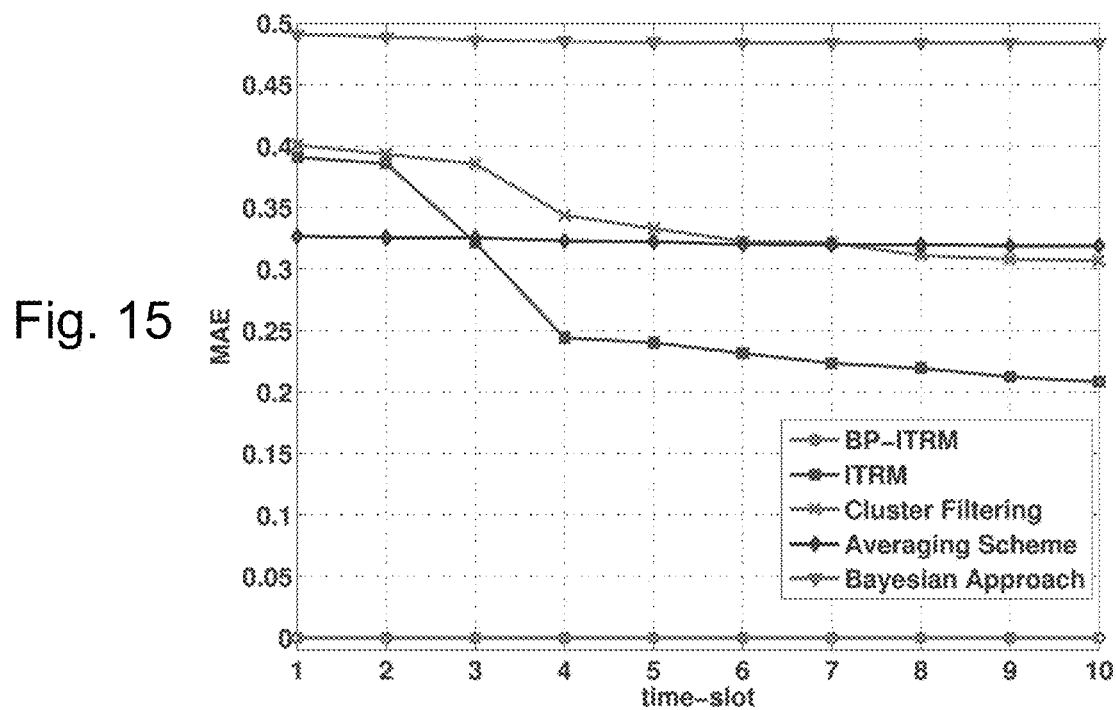
FIG. 15 illustrates a simulation of the MAE performance of various schemes when 30 percent of the newcomer raters are malicious and rating values are from $\{1; \ldots; 5\}$, according to an exemplary embodiment of the present disclosed technology.

FIG. 15 illustrates a simulation of the MAE performance of various schemes when 30 percent of the newcomer raters are malicious, according to an exemplary embodiment of the present disclosed technology. It was concluded that BP-ITRM significantly outperforms the Averaging Scheme, Bayesian Approach, and Cluster Filtering in the presence of attackers. The Bayesian Approach (Buchegger) was identified as performing the worst against the RepTrap attack and colluding attacks from malicious raters. ITRM (i.e., an algebraic iterative scheme) was identified as the closest in accuracy to BP-ITRM, emphasizing the robustness of using iterative message passing algorithms for reputation management.

V. EXEMPLARY SYSTEMS

As shown in FIG. 1, the reputation management system 100 can comprise one or more computers 50 and one or more servers 150. The computers 50 can connect to each other and to a server 150 by one or more networks, such as the Internet 170. Accordingly, the computers 50 and the server 150 can be in communication with one another.

Exemplary embodiments of the reputation management system 100 can be described in a general context of computer-executable instructions, such as one or more applications or program modules. Such computer-readable instructions can be stored on one or more computer-readable media associated with the computers 50 or the server 150, and can executed by one or more computer processing units on the computers 50 or the server 150. Generally, program modules can include routines, programs, objects, components, or data structures that perform particular tasks or implement particular abstract data types. Embodiments of the system 100 can also be practiced in distributed computing environments where tasks are performed by remote processing devices that are linked through the network 170. In a distributed computing environment, program modules can be located in both local and remote computer storage media and devices.

Each computer 50 can be selected from various general purpose and special purpose computing devices and computing systems. For example, and not limitation, well-known computing systems, environments, and/or configurations that may be suitable for use with the invention include personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The server 150 can comprise the same or similar components as the client computers 50. In an exemplary embodiment, the server can comprise a central authority 140. Additionally, in some exemplary embodiments, the server 150 can comprise a server assembly distributed across two or more computing devices. Portions of computer-readable instructions on the server 150 can include, for example, instructions for implementing server-side processes of the reputation management system 100, such as a ratings collection unit or reputation management unit. Such server-side processes can include collecting and processing ratings from the client computers 50, as well computing and maintaining reputation and trustworthiness values for service providers 120 and raters 110, respectively. Additionally, if the reputation management system 100 comprises one or more web application programs, the server 150 can support one or more websites, through which the client computers 50 can access the reputation management system 100 via web clients. In some embodiments, the clients can provide ratings to the server via website.

VI. CONCLUSION

As described above, the reputation management system 100 can provide an accurate, robust, and scalable scheme that is also resilient to various ways a reputation system can be attacked. While the reputation management system 100 has been disclosed in exemplary forms, it will be apparent to those skilled in the art that many modifications, additions, and deletions may be made without departing from the spirit and scope of the system, method, and their equivalents, as set forth in the following claims.

The invention claimed is:

1. A computer program product embodied in a computer-readable medium, the computer program product comprising an algorithm adapted to effectuate a method for reputation management, the method comprising:
   receiving a plurality of ratings, wherein each rating is associated with a service provider and a rater;
   modeling the service providers, the raters, and the ratings as a factor graph representing the factorization of a joint probability distribution function of variables;
   wherein each factor node corresponds to a rater and is associated with a local function representing marginal distributions of a subset of the variables, the subset comprising a trustworthiness value associated with the rater and one or more ratings associated with the rater;
   wherein each variable node corresponds to a service provider and the service provider is associated with a reputation value;
   calculating the marginal distributions using a belief propagation algorithm applied to the factor graph; and
   determining reputation values associated with the service providers and trustworthiness values associated with the raters based on the calculating.

2. The method of claim 1, wherein calculating comprises iteratively passing messages between factor nodes and variable nodes connected by an edge; and
   wherein an edge connecting a factor node and a variable node represents one or more ratings associated with a rater and a service provider corresponding to the factor node and variable node, respectively.

3. The method of claim 2, wherein messages are passed until a termination conditions is reached.

4. The method of claim 3, wherein the termination condition is reached when the determined reputation values for one or more of the service providers remain constant between at least two iterations.

5. The method of claim 2, wherein a message from a variable node to the factor node represents a probability that a reputation value associated with the corresponding service provider equals a certain value at a current iteration; and wherein a message from a factor node to a variable node represents a probability that a reputation value associated with a corresponding service provider equals a certain value given one or more ratings between the corresponding service provider and a corresponding rater and the trustworthiness value associated with the corresponding rater at the current iteration.

6. The method of claim 2, further comprising receiving an additional rating associated with a first service provider and a first rater; and updating an edge corresponding to the first service provider and first rater based on the additional rating and a priority factor.

7. The method of claim 6, wherein the priority factor is based at least partially on a time elapsed since receiving a prior rating associated with the first service provider and the first rater.

8. The method of claim 6, wherein the priority factor gives greater importance to more recent ratings.

9. The method of claim 2, wherein a computational complexity of calculating is linear in the number of service providers and raters.

10. The method of claim 2, wherein the belief propagation algorithm is in log domain.

11. The method of claim 2, wherein the mean absolute error of the determined reputation values is less than or equal to a predetermined error threshold $\epsilon$ for each of the service providers.

12. The method of claim 2, wherein the raters and service providers are buyers and sellers in a marketplace.

13. The method of claim 2, wherein the service providers and raters are nodes on a computer network.

14. A system for reputation management comprising:
a plurality of service providers, each service provider associated with a reputation value;
a plurality of raters, each rater associated with a trustworthiness value;
a ratings collection unit configured to receive ratings, each rating associated with a service provider from the plurality of service providers and a rater from the plurality of raters;
a reputation management unit configured to calculate reputation values and trustworthiness values using a belief propagation algorithm.

15. The system of claim 14, the reputation management unit configured to calculate reputation values in slotted time.

16. The system of claim 14, the ratings collection unit configured to receive ratings and the reputation management unit configured to calculate reputation values in real time.

17. The system of claim 14, wherein one or more service providers are raters.

18. The system of claim 14, configured to flag raters that have a trustworthiness value lower than a predetermined threshold.

19. The system of claim 18, configured to filter malicious ratings associated with a flagged rater.

20. A computer-implemented method embodied in a non-transitory medium for determining reputation values of sellers and trustworthiness values of buyers in a marketplace represented by a factor graph model, the model including a plurality of variable nodes and function nodes corresponding to the sellers and buyers, respectively, the variable nodes and function nodes linked by edges representing ratings of a seller provided by a buyer, comprising:
receiving an additional rating associated with a first seller and a first buyer;
updating an edge corresponding to the first seller and first buyer based on the additional rating and a priority factor, wherein the priority factor gives greater importance to more recent ratings
calculating the reputation values of sellers and trustworthiness values of buyers using a belief propagation algorithm applied to the model;
flagging buyers with a calculated trustworthiness value below a certain threshold.

* * * * *